United States Patent
Inamura et al.

(10) Patent No.: US 7,611,783 B2
(45) Date of Patent: Nov. 3, 2009

(54) MAGNETIC RECORDING MEDIUM AND MAGNETIC RECORDING DEVICE

(75) Inventors: Ryosaku Inamura, Kawasaki (JP); Isatake Kaitsu, Kawasaki (JP); Takuya Uzumaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 426 days.

(21) Appl. No.: 11/374,424

(22) Filed: Mar. 14, 2006

(65) Prior Publication Data

US 2006/0222901 A1 Oct. 5, 2006

Related U.S. Application Data

(63) Continuation-in-part of application No. 11/167,579, filed on Jun. 28, 2005.

(30) Foreign Application Priority Data

Mar. 31, 2005 (JP) .............................. 2005-104766
Feb. 28, 2006 (JP) .............................. 2006-053288

(51) Int. Cl.
*G11B 5/66* (2006.01)
(52) U.S. Cl. .................... 428/827; 428/829; 428/831.2; 428/836.1
(58) Field of Classification Search ........................ None
See application file for complete search history.

(56) References Cited

U.S. PATENT DOCUMENTS 6,830,824 B2 * 12/2004 Kikitsu et al. ............ 428/828.1
7,498,092 B2 * 3/2009 Berger et al. ................. 428/829
2003/0104247 A1 * 6/2003 Girt ............................. 428/693
2004/0053078 A1 * 3/2004 Kikitsu et al. .......... 428/694 TM
2004/0151949 A1 * 8/2004 Oikawa et al. ......... 428/694 TM
2004/0185308 A1 9/2004 Koda et al.
2006/0246323 A1 * 11/2006 Liu et al. ..................... 428/829

FOREIGN PATENT DOCUMENTS

| JP | 2001-148109 | 5/2001 |
| JP | 2004-227666 | 8/2004 |
| JP | 2004-259423 | 9/2004 |
| JP | 2005-44415 | 2/2005 |

* cited by examiner

*Primary Examiner*—Kevin M. Bernatz
*Assistant Examiner*—Gary D. Harris
(74) *Attorney, Agent, or Firm*—Westerman, Hattori, Daniels & Adrian, LLP

(57) ABSTRACT

A magnetic recording medium includes; a base member; an underlayer formed on the base member; a main recording layer formed on the underlayer, and a writing assist layer formed on or under the main recording layer in contact with the main recording layer. The main recording layer has perpendicular magnetic anisotropy with an anisotropic magnetic field of $H_{k1}$ and an inclination of a reversal part of a magnetization curve of $a_1$. The writing assist layer has an anisotropic magnetic field of $H_{k2}$ and an inclination of a reversal part of a magnetization curve of $a_2$. The anisotropic magnetic fields $H_{k1}$ and $H_{k2}$ and the inclinations $a_1$ and $a_2$ satisfy $H_{k1} > H_{k2}$ and $a_2 > a_1$.

20 Claims, 8 Drawing Sheets

MAGNETIC RECORDING MEDIUM AND MAGNETIC RECORDING DEVICE

CROSS-REFERENCE TO RELATED APPLICATIONS

This application is based on and claims priority of Japanese Patent Application No. 2005-104766 filed on Mar. 31, 2005, and Japanese Patent Application No. 2006-053288 filed on Feb. 28, 2006, the entire contents of which are incorporated herein by reference.

BACKGROUND OF THE INVENTION

1. Field of the Invention

The present invention relates to a magnetic recording medium and a magnetic recording device.

2. Description of the Related Art

In recent years, an amount of information processed by a computer or the like is increasing at a significant rate, and recording equipment used with the computer is required to attain higher recording density. Among many recording media, magnetic recording media such as magnetic disks are historically older than the other media and widely used.

Most of magnetic recording media supplied to the market to date are in-plane magnetic recording media in which direction of magnetization recorded in a recording layer is directed in the in-plane direction. To obtain higher recording density in the in-plane recording media, for example, thickness of the recording layer is reduced, and size of magnetic crystal grains constituting the recording layer is reduced for reduction in interaction between the magnetic crystal grains. However, the magnetic crystal grains reduced in size like this cause decrease in thermal stability and cause a phenomenon that information is lost by heat applied to the magnetic disk. Such a phenomenon is called thermal fluctuation and contributes to preventing higher recording density.

As a magnetic recording medium which achieves higher recording density without reducing the size of magnetic crystal grains, therefore, a perpendicular magnetic recording medium has attracted attention in recent years, in which the direction of magnetization in the recording layer is directed to a perpendicular direction to the in-plane direction of the recording layer.

According to the perpendicular magnetic recording medium, compared to the in-plane magnetic recording medium, each magnetic domain requires a smaller area in the surface of the recording layer, and higher recording density can be achieved. Furthermore, the magnetization is directed to the perpendicular direction to the in-plane direction of the recording layer, and accordingly, the recording layer can be made thicker. The thermal fluctuation, which is caused in a thin recording layer, is therefore less likely to occur.

As a recording layer of the perpendicular magnetic recording medium, a granular recording layer is attracting attention recently. The granular recording layer includes columnar magnetic crystal grains long in the perpendicular direction of the recording layer, and the columnar magnetic crystal grains are separated from each other by an oxide or a nitride. For, example, a CoPt alloy or the like is used for the magnetic crystal grains.

In the granular recording layer, when the content of the oxide or nitride is increased, the perpendicular magnetic anisotropy increases excessively. In this case, it is difficult to reverse magnetization of the granular recording layer using a magnetic head, and writing information to the granular recording layer becomes difficult.

On the other hand, if the content of oxide or nitride is reduced, the magnetic anisotropy of the granular recording layer decreases, thus facilitating writing information to the granular recording layer. However, the direction of the magnetization of the magnetic crystal grains is easily reversed by heat, and the aforementioned heat fluctuation occurs.

As described above, in the perpendicular magnetic recording medium using the granular recording layer, there is a trade-off relationship between the writing performance and the resistance to thermal fluctuation. To achieve a high recording density of, for example, 200 Gbit/in$^2$ or more in the future, how to strike a balance between these properties becomes an issue.

As a technology related to this application, Patent Literature 1 discloses that the recording layer is composed of a plurality of granular magnetic layers having different oxide contents and the oxide content of the lowermost granular magnetic layer is the highest in the recording layer.

Patent Literature 2 discloses that as a soft magnetic layer formed under the recording layer, a soft magnetic layer having perpendicular magnetic anisotropy and a soft magnetic layer having in-plane magnetic anisotropy are formed in this order.

The technologies related to the present invention are also disclosed in the following Patent Literatures 3 and 4.

(Patent Literature 1) Japanese Patent Laid-Open publication No. 2004-259423

(Patent Literature 2) Japanese Patent Laid-Open publication No. 2004-227666

(Patent Literature 3) Japanese Patent Laid-Open publication No. 2001-148109

(Patent Literature 4) Japanese Patent Laid-Open publication No. 2005-044415

SUMMARY OF THE INVENTION

According to one aspect of the present invention, a magnetic recording medium is provided, which includes: a base member; an underlayer formed on the base member; a main recording layer formed on the underlayer; and a writing assist layer formed on or under the main recording medium in contact with the main recording medium. The main recording layer has perpendicular magnetic anisotropy with an anisotropic magnetic field of $H_{k1}$ and an inclination of a reversal part of a magnetization curve of $a_1$. The writing assist layer has an anisotropic magnetic field of $H_{k2}$ and an inclination of a reversal part of a magnetization curve of $a_2$. The anisotropic magnetic fields $H_{k1}$ and $H_{k2}$ and the inclinations $a_1$ and $a_2$ satisfy $H_{k1}>H_{k2}$ and $a_2>a_1$.

According to the present invention, the anisotropic magnetic fields $H_{k1}$ and $H_{k2}$ and inclinations $a_1$ and $a_2$ of the main recording layer and the writing assist layer satisfy $H_{k1}>H_{k2}$ and $a_2>a_1$. Such characteristics are observed when the perpendicular magnetic anisotropy of the main recording layer is larger than that of the writing assist layer. Accordingly, in the present invention, a structure in which the main recording layer with large perpendicular magnetic anisotropy and the writing assist layer with small perpendicular magnetic anisotropy are laminated on each other is obtained.

Since the main recording layer has large perpendicular magnetic anisotropy, magnetization of the main recording layer is not easily reversed with an external magnetic field, and magnetic information is difficult to be written to the main recording layer. However, when the writing assist layer whose perpendicular magnetic anisotropy is small and its magnetization is easily reversed by the external magnetic field is provided in contact with the main recording layer, magnetization reversal in the main recording layer is induced by interaction between spins of these layers along with the magnetization reversal in the writing assist layer by the external magnetic field, thus facilitating writing magnetic information to the main recording layer.

Moreover, the large perpendicular magnetic anisotropy of the main recording layer stabilizes the direction of the magnetization of each magnetic domain of the main recording layer due to the interaction therebetween. Accordingly, the direction of the magnetization carrying magnetic information is less likely to be reversed by heat, thus increasing the resistance to thermal fluctuation of the main recording layer.

In the present invention, it is therefore possible to provide the magnetic recording medium which strikes a balance between the writing performance and the resistance to thermal fluctuation.

According to another aspect of the present invention, a magnetic recording device is provided, which includes: a magnetic recording medium and a magnetic head opposing the magnetic recording medium. The magnetic recording medium includes: a base member; an underlayer formed on the base member; a main recording layer formed on the underlayer; and a writing assist layer formed on or under the main recording layer in contact with the main recording layer. The main recording layer has perpendicular magnetic anisotropy with an anisotropic magnetic field of $H_{k1}$ and an inclination of a reversal part of a magnetization curve of $a_1$. The writing assist layer has an anisotropic magnetic field of $H_{k2}$ and an inclination of a reversal part of a magnetization curve of $a_2$. The anisotropic magnetic fields $H_{k1}$ and $H_{k2}$ and the inclinations $a_1$ and $a_2$ satisfy $H_{k1}>H_{k2}$ and $a_2>a_1$.

According to the present invention, the magnetic recording device includes the magnetic recording medium which strikes a balance between the writing performance and the resistance to thermal fluctuation as explained above. Therefore, the write operation is facilitated, and the reliability for storing information is assured for a long period of time.

DESCRIPTION OF THE PREFERRED EMBODIMENTS (1) First Embodiment

Next, a description is given of a magnetic recording medium according to an embodiment of the present invention in detail, following a production process thereof.

FIGS. 1A to 1F are cross-sectional views of the magnetic recording medium according to the first embodiment in the course of production. This magnetic recording medium is a perpendicular magnetic recording medium in which the direction of magnetization in a recording layer is directed to the perpendicular direction to the in-plane direction.

Figure 1A:
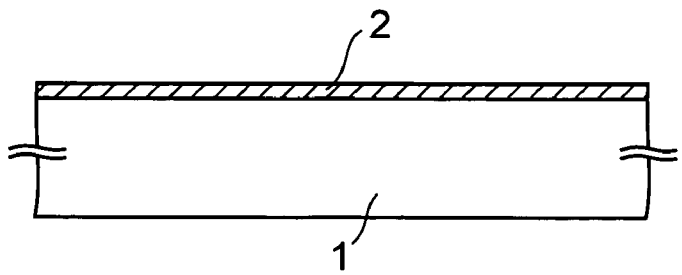
FIGS. 1A to 1F are cross-sectional views showing a magnetic recording medium in the course of production according to a first embodiment of the present invention.

First, as shown in FIG. 1A, on a non-magnetic base member 1 such as a glass substrate with rigidity increased by a chemical treatment for the surface, a Cr (chrome) layer is formed to a thickness of about 3 nm by sputtering at a sputtering pressure of about 0.3 to 0.8 Pa to be a first seed layer 2. The deposition rate of the first seed layer 2 is not particularly limited and is set to, for example, 5 nm/sec in this embodiment. The first seed layer 2 plays a role in preventing the surface state of the base member 1 from affecting a film laminated in the following step and also has a function as an adhesion layer. If there is no problem in crystallinity of the film formed in the following step without the first seed layer 2, the first seed layer 2 may be omitted.

The base member 1 is not limited to the glass substrate and may be a plastic substrate, a NiP plated aluminum alloy substrate, or a silicon substrate when the recording medium is a solid medium like a hard disk. When the recording medium is a flexible tape, the base member 1 may be formed of PET (polyethylene terephthalate), PEN (polyethylene naphthalate), polyimide, or the like.

Figure 1B:
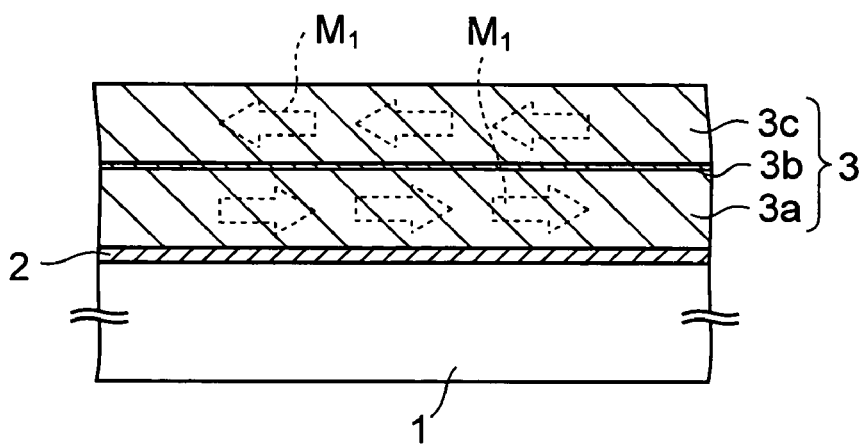

Next, as shown in FIG. 1B, a soft magnetic amorphous CoZr (cobalt-zirconium alloy) layer is formed to a thickness of about 30 nm on the first seed layer 2 as a lower soft magnetic underlayer 3a by sputtering under the condition of pressure of 0.3 to 0.8 Pa, and deposition rate of 5 nm/sec. The above CoZr may be added with Ta (tantalum) or Nb (niobium). The soft magnetic amorphous material constituting the lower soft magnetic underlayer 3a is not limited to CoZr, and the lower soft magnetic underlayer 3a may be composed of FeC (iron-carbon alloy). In that case, Co (cobalt) or Ni (nickel) may be added to FeC.

On the lower soft magnetic underlayer 3a, an extremely thin non-magnetic layer, for example, a Ru (ruthenium) layer with a thickness of about 0.3 to 1.0 nm is formed by sputtering, and make this layer into a magnetic domain control layer 3b. Instead of the ruthenium layer, a copper layer may be formed as the magnetic domain control layer 3b.

Furthermore, an amorphous CoZr layer with a thickness of about 30 nm as an upper soft magnetic underlayer 3c is formed on the magnetic domain control layer 3b by means of sputtering using the same film-forming conditions as those of the above-described lower soft magnetic underlayer 3a. Similar to the above-described lower soft magnetic underlayer 3a, the upper soft magnetic underlayer 3c suffices to be composed of a soft magnetic amorphous material and may be a FeC layer.

A backing layer 3 which includes the lower soft magnetic underlayer 3a, magnetic domain control layer 3b, and upper soft magnetic underlayer 3c formed in this order is thus formed on the first seed layer 2.

In the thus-structured backing layer 3, the lower and upper soft magnetic underlayers 3a and 3c are antiferromagnetically coupled with each other with the magnetic domain control layer 3b interposed therebetween. Magnetizations M1 of the soft magnetic layers 3a and 3c are stabilized in parallel and opposite directions. Even if there is "butting", which is observed in the case where adjacent magnetizations are directed in opposite directions, in a film plane of the upper or lower soft magnetic layer 3c or 3a, magnetic flux leaking out of the "butting" portion returns back within the backing layer 3 since the magnetizations of the soft-magnetic layers 3a and 3c are directed in parallel and opposite directions. Accordingly, magnetic flux generated from magnetic walls is less likely to extend above the backing layer 3, and a later-described magnetic head does not detect the magnetic flux. This makes it possible to reduce spike noise generated at reading due to the above magnetic flux.

In another structure to reduce spike noise, a soft magnetic underlayer of a single layer may be formed on an antiferromagnetic material layer. The antiferromagnetic material layer in this case is composed of, for example, IrMn, FeMn, or the like.

Figure 1C:
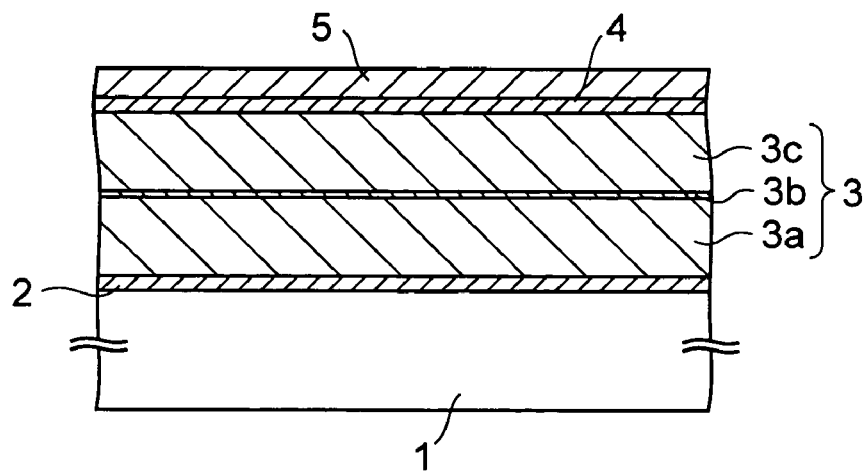

Subsequently, as shown in FIG. 1C, a tantalum layer is formed to a thickness of about 3 nm on the backing layer 3 as a second seed layer 4. The tantalum layer is formed by sputtering, and the film-forming conditions thereof are, for example, a sputtering pressure of 0.3 to 0.8 Pa and a deposition rate of 5 nm/sec. The second seed layer 4 may be a carbon layer instead of the tantalum layer.

Thereafter, by employing the sputtering method whose condition is set as deposition pressure of 0.3 to 0.8 Pa and deposition rate of 5 nm/sec, a soft magnetic NiFe (nickel-iron alloy) layer is formed to a thickness of about 5 nm on the second seed layer 4, and the NiFe layer is made into an orientation control layer 5.

Since the second seed layer 4 is formed thereunder, the NiFe layer constituting the orientation control layer 5 is not affected by the surface state of the backing layer 3 and has a good fcc (face-centered cubic) crystal structure. In place of NiFe, the orientation control layer 5 having fcc structure may be composed of any one selected from the group consisting of Pt (platinum), Pd (palladium), NiFeSi (nickel iron silicon alloy), Al (aluminum), Cu (copper), and In (indium).

When the orientation control layer 5 is composed of the aforementioned soft magnetic material such as NiFe, the orientation control layer 5 also has the function of the upper soft magnetic underlayer 3c. Accordingly, the apparent distance between the later-described magnetic head and the upper soft magnetic underlayer 3c becomes short, and the magnetic head can sensitively detect the magnetic information.

Figure 1D:
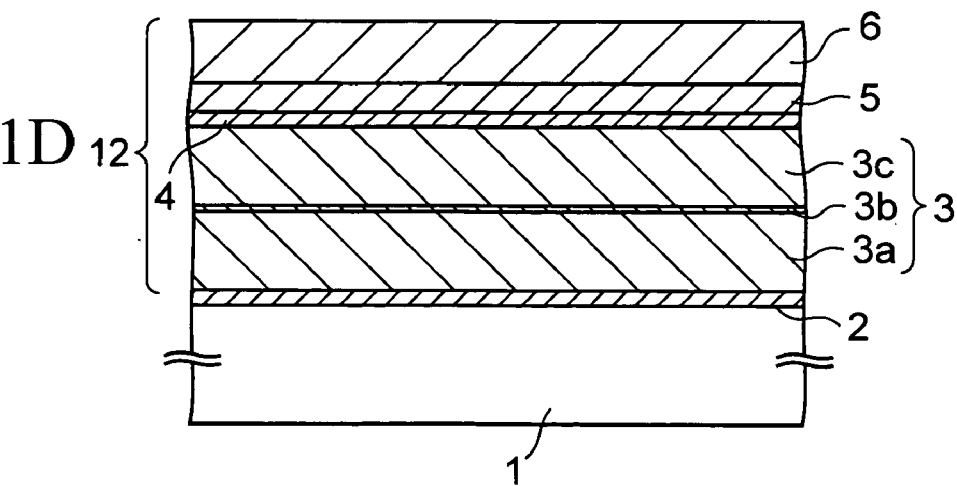

Next, as shown in FIG. 1D, a Ru layer is formed to a thickness of about 10 nm on the orientation control layer 5 as a non-magnetic layer 6 by sputtering under the pressure of 4 to 10 Pa. The deposition rate of the Ru layer is preferably as low as possible and is set to 0.5 nm/sec in this embodiment.

The Ru layer constituting the non-magnetic layer 6 has an hcp (hexagonal close-packed) crystal structure, and the hcp structure has a good lattice match with the fcc structure which is the crystal structure of the orientation control layer 5. Furthermore, the orientation control layer 5 functions to absorb the unevenness of the upper surface of the second seed layer 4 thereunder. By such an operation of the orientation control layer 5, the non-magnetic layer 6 with orientations aligned in one direction and with good crystallinity can be deposited on the orientation control layer 5.

The non-magnetic layer 6 of the hcp structure may be composed of, instead of the Ru layer, an Ru alloy including Ru and Co, Cr, W (tungsten), or Re (rhenium).

By these steps, an underlayer 12 including the aforementioned layers 2 to 6 stacked on each other is formed on the base member 1.

Figure 1E:
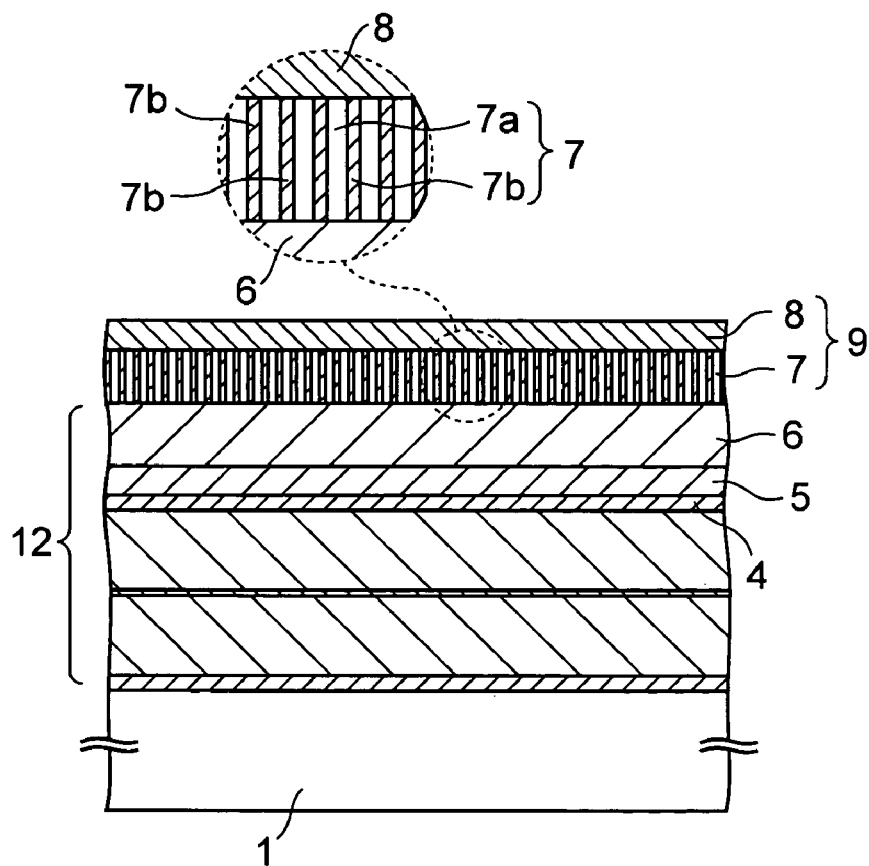

Next, a description is given of steps until a cross-sectional structure shown in FIG. 1E is obtained.

First, the base member 1 is put in a sputtering chamber provided with a $Co_{70}Cr_{10}Pt_{20}$ target and a $SiO_2$ target. Next, gas including Ar gas added with a small amount of $O_2$, for example, 0.2% to 2% of $O_2$ at flow rate is introduced into the chamber as sputtering gas. The pressure is stabilized at a relatively high pressure of about 3 to 7 Pa, and the substrate temperature is maintained at a relatively low temperature of 10 to 80° C.

Sputtering of $Co_{70}Cr_{10}Pt_{20}$ and $SiO_2$ is started by applying high frequency power of 400 to 1000 W between the targets and base member 1 in this state. The frequency of the high frequency power is not particularly limited and for example, may be 13.56 MHz. Furthermore, it is possible to perform electric discharge in the chamber using DC power of about 400 to 1000 W instead of the high frequency power.

As described above, when the film-forming conditions of relatively high pressure (about 3 to 7 Pa) and low temperature (about 10 to 80° C.) are employed in sputtering, a film with lower density is formed as compared to the case of film forming at low pressure and high temperature. Therefore, the target materials $Co_{70}Cr_{10}Pt_{20}$ and $SiO_2$ are not mixed with each other, and a main recording layer 7 of a granular structure in which magnetic grains 7b of $Co_{70}Cr_{10}Pt_{20}$ are dispersed in a non-magnetic material 7a of silicon oxide ($SiO_2$) is formed on the non-magnetic layer 6. In the main recording layer 7, the content of the non-magnetic material 7a is preferably about 5 to 15 at %. In this embodiment, a $(Co_{70}Cr_{10}Pt_{20})_{93}(SiO_2)_7$ layer containing 7 at % of the non-magnetic material 7a is formed as the main recording layer 7. The thickness of the main recording layer 7 is not particularly limited and is, for example, 12 nm in this embodiment. The deposition rate of the main recording layer 7 is set to, for example, 5 nm/sec.

The non-magnetic layer 6 of the hcp structure under the main recording layer 7 functions to align orientations of the magnetic grains 7b in the perpendicular direction to the in-plane direction. The magnetic grains 7b therefore have an hcp crystal structure extending in the perpendicular direction similar to the non-magnetic layer 6. Moreover, the height direction of a hexagonal column of the hcp structure becomes an easy magnetization axis of the main recording layer 7, and therefore the main recording layer 7 shows perpendicular magnetic anisotropy.

In the main recording layer 7 of such a granular structure, each magnetic grain 7b is isolated with their easy magnetization axis aligned, and therefore noise in the main recording layer 7 can be reduced.

In the magnetic grains 7b, with a Pt content of 25 at % or more, the magnetic anisotropy constant $K_u$ of the main recording layer 7 is lowered. Preferably, the Pt content of the magnetic grains 7b is therefore less than 25 at %.

Furthermore, as described above, adding a small amount of $O_2$ of about 0.2 to 2% at the flow rate to the sputtering gas promotes isolation of the magnetic grains 7b in the main recording layer 7, thus improving an electromagnetic conversion characteristic.

Incidentally the isolation of the magnetic grains 7b, that is, an increase in distance between each adjacent pair of the magnetic grains 7b, can be promoted by increasing the unevenness of the surface of the non-magnetic layer 6 under the main recording layer 7. To increase the unevenness, the Ru layer constituting the non-magnetic layer 6 may be grown at a low deposition rate of about 0.5 nm/sec as described above.

The non-magnetic material 7a is a silicon oxide in the above description but may be also an oxide other than the silicon oxide. Such an oxide is, for example, an oxide of Ti (titanium), Cr, or Zr (zirconium). Moreover, the non-magnetic material 7b may be a nitride of Si (silicon), Ti, Cr, or Zr.

Furthermore, the magnetic grains 7b may be grains composed of a CoFe alloy containing Co and Fe (iron). In the case of using the CoFe alloy, the main recording layer 7 is preferably heat-treated to form an HCT (honeycomb chained triangle) structure as the crystal structure of the magnetic grains 7b. Moreover, copper or silver may be added to the CoFe alloy.

Next, an alloy layer containing Co and Cr, for example, a $Co_{66}Cr_{20}Pt_{10}B_4$ layer is formed to a thickness of about 6 nm on the main recording layer 7 by sputtering using Ar gas as sputtering gas, and the $Co_{66}Cr_{20}Pt_{10}B_4$ layer is made into a writing assist layer 8. The film-forming conditions of the writing assist layer 8 are not particularly limited but are, for example, a sputtering pressure of 0.3 to 0.8 Pa and a deposition rate of 5 nm/sec in this embodiment.

The $Co_{66}Cr_{20}Pt_{10}B_4$ layer constituting the writing assist layer 8 has the same HCP structure as the magnetic grains 7b in the main recording layer 7 thereunder. Therefore, the writing assist layer 8 and the magnetic grains 7b have a good lattice match, and the writing assist layer 8 grown on the main recording layer 7 has good crystallinity.

The $Co_{66}Cr_{20}Pt_{10}B_4$ layer contains 20 at % and 10 at % of Cr and Pt, respectively, while $Co_{70}Cr_{10}Pt_{20}$ constituting the magnetic grains 7b of the main recording layer 7 contains 10 at % and 20 at % of Cr and Pt, respectively. By setting the contents of Cr and Pt in the magnetic grains 7b lower and higher than those of the writing assist layer 8, respectively, the perpendicular magnetic anisotropy of the main recording layer 7 further increases, as compared with that of the writing assist layer 8. This results in an increase in resolution of magnetic data in the main recording layer 7 and reduction in write core width, achieving higher recording density of the main recording layer 7.

Furthermore, setting the contents of Cr and Pt as described above increases coercivity $H_c$ of the main recording layer 7 and therefore further reduces part of noise, for example, transition noise in the main recording layer.

A recording layer 9 including the main recording layer 7 and writing assist layer 8 laminated in this order is thus formed on the non-magnetic layer 6.

The $Co_{66}Cr_{20}Pt_{10}B_4$ layer constituting the writing assist layer 8 may be added with Ta (tantalum), Cu (copper), or Ni (nickel).

Figure 1F:
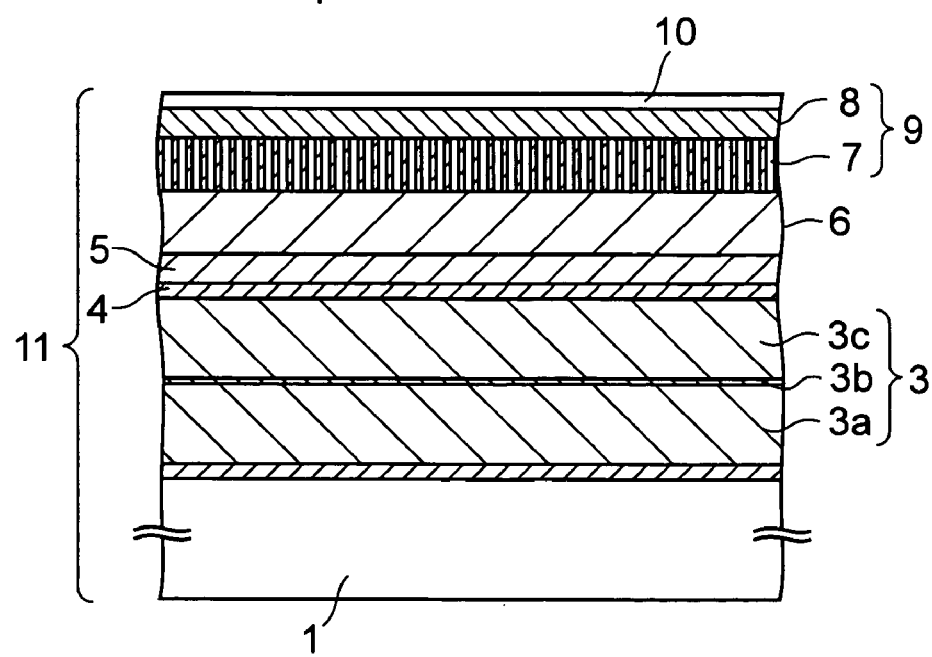

Subsequently, as shown in FIG. 1F, a DLC (diamond like carbon) layer is formed to a thickness of about 4 nm on the recording layer 9 as a protection layer 10 by means of RF-CVD (radio frequency-chemical vapor deposition) using $C_2H_2$ gas as reactive gas. The film-forming conditions of the protection layer 10 are, for example: a pressure of about 4 Pa, a high frequency power of 1000 W, and a bias voltage between the base member and a shower head of 200 V.

A basic structure of a magnetic recording medium 11 according to this embodiment is thus completed.

Figure 2:
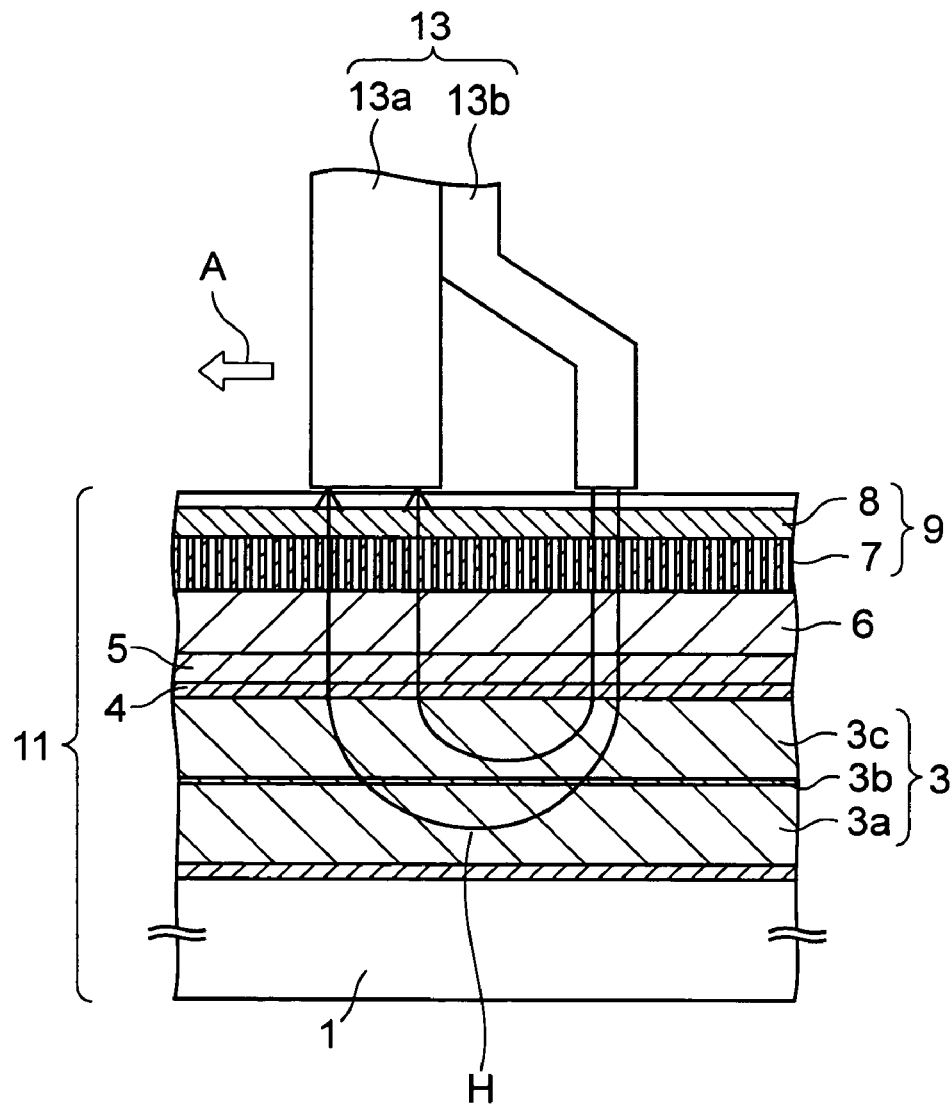
FIG. 2 is a cross-sectional view for explaining a write operation to the magnetic recording medium according to the first embodiment of the present invention.

FIG. 2 is a cross-sectional view for explaining a write operation to the magnetic recording medium 11.

For writing, as shown in FIG. 2, a magnetic head 13 having a main magnetic pole 13b and a return yoke 13a is opposed to the magnetic recording medium 11, and a recording magnetic field H which is generated in the main magnetic pole 13b with a small cross sectional area and has high magnetic flux density is put through the recording layer 9. In this way, in magnetic domains directly under the main magnetic pole 13b in the main recording layer 7 with perpendicular magnetic anisotropy, magnetization is reversed by this recording magnetic field H, and information is written.

After perpendicularly penetrating the main recording layer 7, the recording magnetic field H goes through the backing layer 3, which constitutes a magnetic flux circuit in corporation with the magnetic head 13, in the in-plane direction, again passes through the main recording layer 9, and then returns back to the return yoke 13a with a large cross-sectional area at low magnetic flux density.

Then, the direction of the recording magnetic field H is changed according to a recording signal while the magnetic recording medium 11 and the magnetic head 13 are relatively moved in a direction A in the drawing in a plane. Accordingly, a plurality of magnetic domains perpendicularly magnetized are continuously formed in the track direction of the recording medium 11, and the recording signal is recorded in the magnetic recording medium 11.

In the magnetic recording medium 11, two layers of the main recording layer 7 and writing assist layer 8 constitute the recording layer 9 in corporation with each other. To describe advantages obtained by such a structure, the magnetic characteristic of each layer is described below.

Figure 3A:
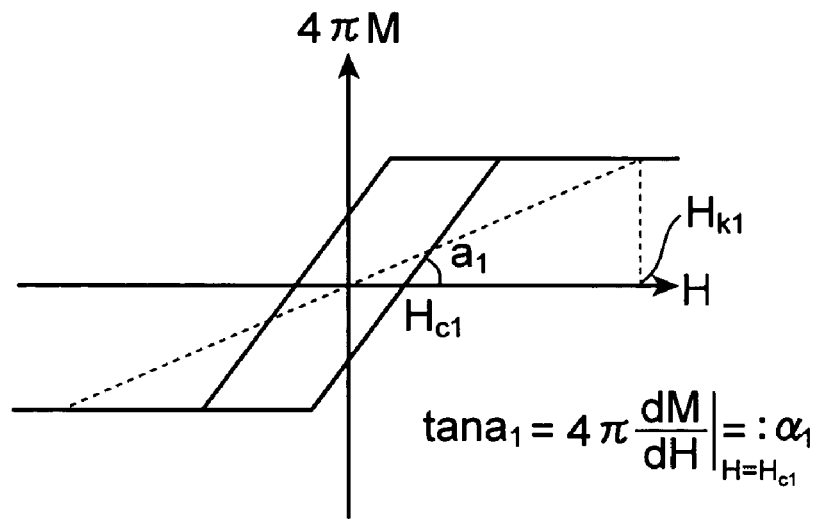
FIG. 3A shows magnetization curves of a main recording layer in the case of not forming a writing assist layer in the first embodiment of the present invention.

A real curve of FIG. 3A indicates a magnetization curve when a magnetic field in the direction of the easy magnetization axis of the main recording layer 7 is applied to the main recording layer 7 in the case where the writing assist layer 8 is not formed. The horizontal axis indicates the magnetic field H, and the vertical axis indicates magnetization M. In the same drawing, a dotted line indicates a magnetization curve when a magnetic field in the in-plane direction is applied to the main recording layer 7 in the above case.

As previously described, the main recording layer 7 has the granular structure composed of the non-magnetic material 7a and magnetic grains 7b. In such a structure, when the content of the non-magnetic material 7a in the main recording layer 7 is increased to increase the distance between each adjacent pair of the magnetic grains 7b, the interaction between the magnetic grains 7b decreases, and the magnetic anisotropy of the main recording layer increases. Therefore, when an external magnetic field is applied to the main recording layer 7, the magnetization of the magnetic grains 7b is not easily reversed by the external magnetic field, and an angle $a_1$, between the magnetization curve and the horizontal axis decreases while an anisotropic magnetic field $H_{k1}$ increases.

As described above, the magnetic anisotropy can be expressed by the above angle $a_1$ and anisotropic magnetic field $H_{k1}$, and among these, the angle $a_1$ is an index equivalent to an inclination $a_1$ of a reversal part of the magnetization curve. The inclination $a_1$ is also called as a magnetization reversal parameter or the like and defined by the following equation 1.

$$\alpha_1 = 4\pi \frac{dM}{dH}|_{H=H_{C1}} = \tan a_1 \qquad \text{(Equation 1)}$$

In the equation 1, $H_{c1}$ is the coercivity, which is a value of the magnetic field H at an intersection of the magnetization curve and horizontal axis.

In the magnetic layer of the granular structure, as the distance between each adjacent pair of magnetic grains increases and thus the isolation of each magnetic grain is enhanced, the inclination a approaches its minimum value of 1. Contrarily, as the above distance decreases and the interaction of the magnetic grains increases, the inclination a increases.

When the writing assist layer 8 is not formed, the inclination $a_1$ of the main recording layer 7 is typically as small as about 1 to 2, and the anisotropic magnetic field $H_{k1}$ is as large as about 8 to 15 kOe.

Figure 3B:
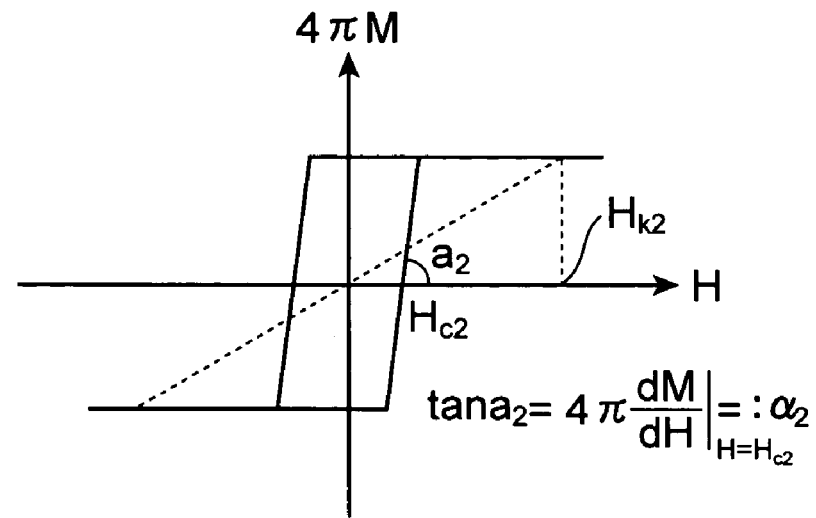
FIG. 3B shows magnetization curves of the writing assist layer in the case of forming only the writing assist layer on a non-magnetic layer but not forming the main recording layer.

On the other hand, FIG. 3B shows magnetization curves of the writing assist layer 8 in the case where the main recording layer 7 is not formed and only the writing assist layer 8 is formed on the non-magnetic layer 6. Similar to FIG. 3A, a real curve indicates a magnetization curve when a magnetic field in the direction (perpendicular direction) of the easy magnetization axis is applied to the writing assist layer 8, and a dotted line indicates a magnetization curve when a magnetic field in the in-plane direction is applied.

The $Co_{66}Cr_{20}Pt_{10}B_4$ layer constituting the writing assist layer 8 has lower magnetic anisotropy than that of the aforementioned main recording layer 7. Therefore, a magnetization reversal parameter (an inclination of the magnetization curve) $a_2$ of the writing assist layer 8 becomes lager than the magnetization reversal parameter $a_1$ of the main recording layer, and becomes about 5 to 30. The anisotropic magnetic field $H_{k2}$ becomes about 3 to 10 kOe, which is smaller than the anisotropic magnetic field $H_{k1}$ of the main recording layer 7 alone.

Figure 3C:
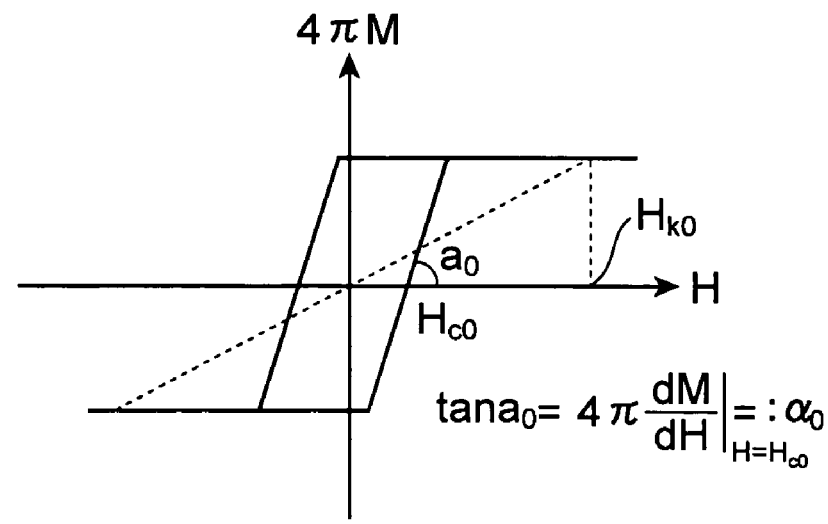
FIG. 3C shows magnetization curves of the recording layer including the main recording layer and writing assist layer laminated on each other.

On the other hand, FIG. 3C shows magnetization curves of the recording layer 11 including the main recording layer 7 and writing assist layer 8 laminated on each other as shown in FIG. 1F. In FIG. 3C, similar to FIGS. 3A and 3B, a magnetization curve when the magnetic field in the direction of the easy magnetization axis is applied to the main recording layer 7 is indicated by a real line, and a magnetization curve when the magnetic field in the in-plane direction is applied is indicated by a dotted line.

As shown in the drawing, an inclination $a_0$ of the magnetization curve of the recording layer 11 is an intermediate value between the inclinations $a_1$ and $a_2$ of the main recording layer 7 and writing assist layer 8, and also an anisotropic magnetic field $H_{k0}$ is an intermediate value between the aforementioned $H_{k1}$ and $H_{k2}$. This is because when the recording layer 11 is exposed to an external magnetic field, magnetization in the writing assist layer 8, which has small magnetic anisotropy and is sensitive to the external magnetic field, is reversed, and magnetization reversal of the main recording layer 7 is correspondingly induced. The magnetic anisotropy of the recording layer 11 is thus smaller than that of the case of the main recording layer 7 alone.

As described above, the writing assist layer 8 has a function to assist magnetization reversal of the main recording layer 7 with larger magnetic anisotropy than that of the writing assist layer 8. Accordingly, as compared to the case where the writing assist layer 8 is not formed, the magnetization of the main recording layer 7 is easily reversed, thus facilitating writing information to the main recording layer 7 without increasing the writing magnetic field generated from the magnetic head.

Moreover, the main recording layer 7 itself has larger magnetic anisotropy than that of the writing assist layer 8, and magnetizations of the magnetic domains in the main recording layer 7 are strongly coupled with each other. Accordingly, the directions of the magnetizations in the main recording layer 7 are not easily reversed even when heat is applied, and the main recording layer 7 is excellent in resistance to thermal fluctuation.

According to these feature, present embodiment can provide the magnetic recording medium which strike a balance between the writing performance and the resistance to thermal fluctuation.

In order to confirm that the resistance to thermal fluctuation of the magnetic recording medium 11 is actually improved, the inventors performed the following examination. In this examination, as a comparative example, the recording layer 9 including only the main recording layer 7 but not including the writing assist layer 8 was produced. The comparative example and the aforementioned magnetic recording medium 11 were examined in terms of S/N ratios in reading operation. Results thereof are shown in Table 1.

TABLE 1

|  | First Embodiment | Comparative Example |
| --- | --- | --- |
| S/N (high frequency) | 16 dB | 14 dB |
| S/N (low frequency) | 21 dB | 17 dB |

In Table 1, the high and low frequencies indicate reading magnetic information written at recording densities of 500 kFCI (flux change per inch) and 50 kFCI, respectively.

As shown in Table 1, the S/N ratios in this embodiment were improved by 2 dB for the high frequency (500 kFCI) and 4 dB for the low frequency (50 kFCI) compared to those of the comparative example. This can reveal that in the aforementioned magnetic recording medium 11, noise involved in thermal fluctuation can be actually reduced.

The inventors of the present invention prepared some mediums, each medium was obtained by varying saturated magnetization (Ms) of the writing assist layer 8. Using such mediums, the inventors of the present invention conducted R(Read)/W(Write) estimation in order to find out the appropriate range of the Ms.

In this examination, a chamber in which a $Co_{66}Cr_{20}Pt_{10}B_4$ target and a Co target are independently provided was used. A plurality of samples, each having different Ms of the writing assist layer 8, was obtained by adjusting the deposition rate of the layer 8. The deposition rate was controlled by independently controlling the electrical power applied to each targets. Furthermore, the thickness of the layer 8 of each medium was adjusted so that the product of the Ms and the thickness became equal to that of a medium in which a $Co_{66}Cr_{20}Pt_{10}B_4$ layer is formed to a thickness of 6 nm. Remaining deposition condition was the same as the medium of the first embodiment.

Figure 4A:
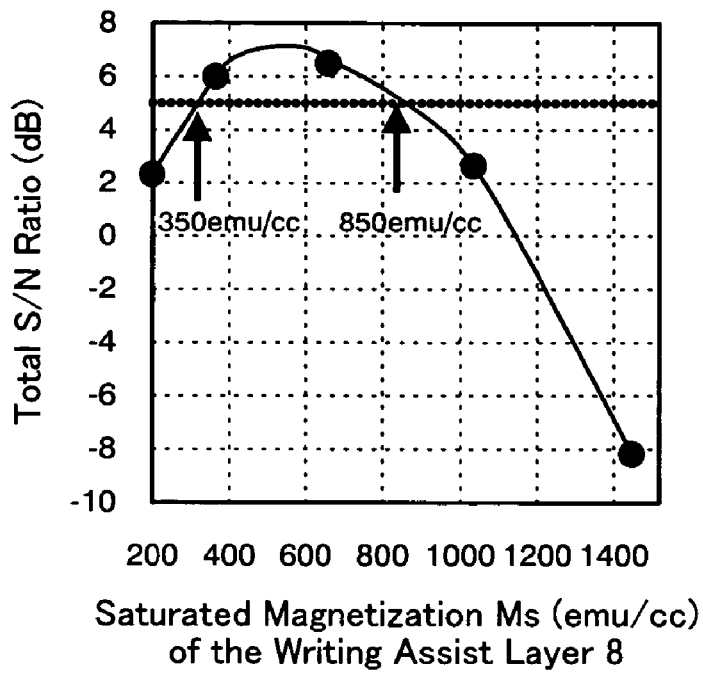
FIG. 4A shows a graph indicating how the total S/N ratios varies according to the Ms of the writing assist layer.
Figure 4B:
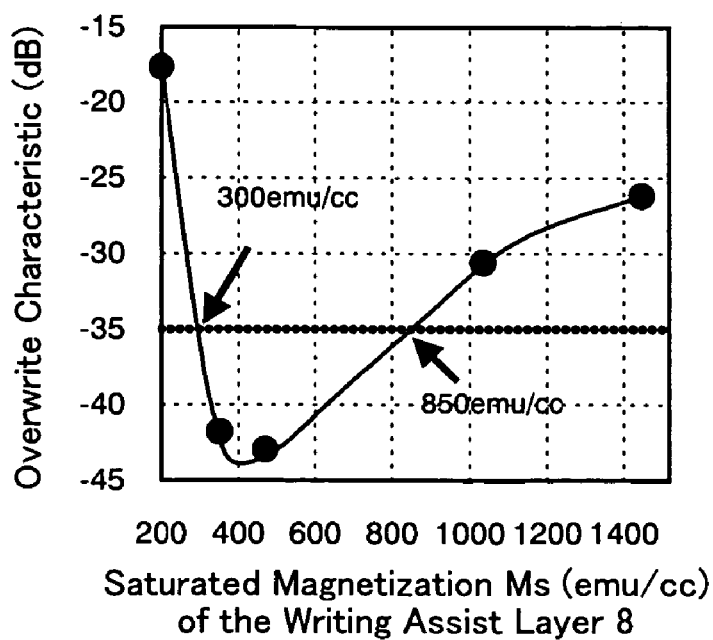
FIG. 4B shows a graph how the overwrite characteristic of the wiring assist layer varies according to its Ms.

FIGS. 4A and 4B shows the result of the examination.

Of these figures, FIG. 4A shows a graph indicating how the total S/N ratios varies according to the Ms of the writing assist layer 8. It should be noted that the total S/N ratio is defined as the sum of the S/N ratio of the magnetic recording medium 11, the magnetic head 13, and the control circuit (not shown). In order to ensure the actual use of the magnetic recording medium 11, total S/N ratio is required to be equal to or grater than 5 dB. According to FIG. 4A, such total S/N ratio can be obtained by making the Ms of the wiring assist layer 8 equal to or greater than 350 emu/cc and equal to or less than 850 nm.

On the other hand, FIG. 4B shows a graph how the overwrite characteristic of the wiring assist layer 8 varies according to the Ms of the layer 8.

In order to ensure the actual use of the magnetic recording medium 11, the overwrite characteristic of the writing assist layer 8 is required to be equal to or less than −35 dB. According to FIG. 4B, such an overwrite characteristic can be obtained by making the Ms of the writing assist layer 8 equal to or more than 300 emu/cc and equal to or less than 850 emu/cc.

From these results, it can be understood that the favorable overwrite characteristic and total S/N ratio can be obtained by making the Ms of the wiring assist layer 8 equal to or greater than 350 emu/cc and equal to or less than 850 nm.

(2) Second Embodiment

The writing assist layer 8 is formed on the main recording layer 7 in the aforementioned first embodiment, but the order of formation is not particularly limited. In this embodiment, these layers 7 and 8 are formed in the reverse order to that of the first embodiment.

Figure 5:
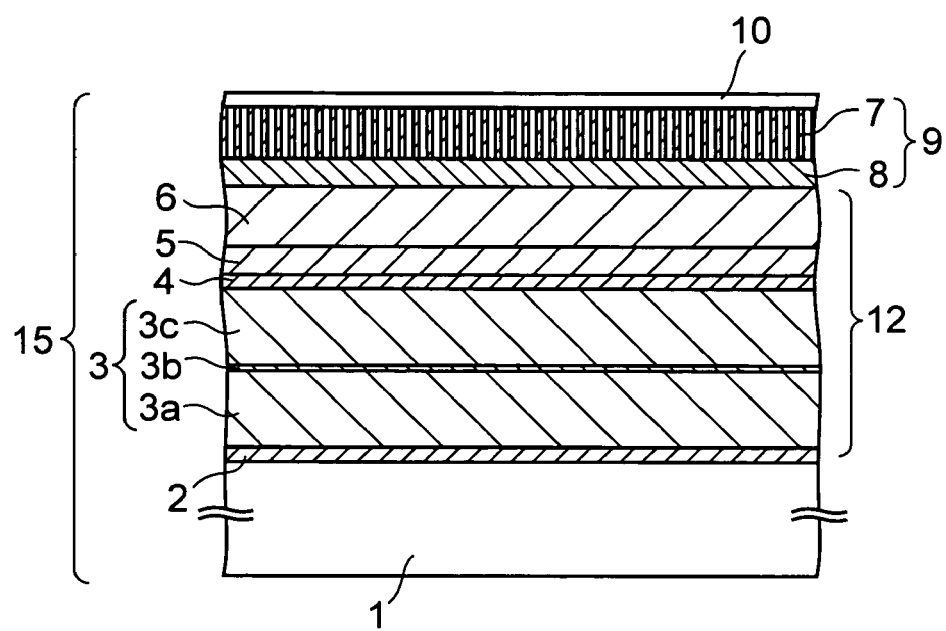
FIG. 5 is a cross-sectional view of a magnetic recording medium according to a second embodiment of the present invention.

FIG. 5 is a cross-sectional view of a magnetic recording medium according to this embodiment. In the drawing, elements described in the first embodiment are given same reference numerals as those of the first embodiment, and the description thereof is omitted below.

As shown in FIG. 5, in this magnetic recording medium 15, the main recording layer 7 with large magnetic anisotropy is formed on the writing assist layer 8 with small magnetic anisotropy in contact therewith. The other configuration of the second embodiment is the same as that of the first embodiment, and the film-forming conditions of each layer constituting the magnetic recording medium 15 are the same as those of the first embodiment.

As described above, even when the main recording layer 7 and the writing assist layer 8 are formed in the reverse order to that of the first embodiment, upon exposure of the recording layer 9 to an external magnetic field, the magnetization is easily reversed in the writing assist layer 8 having small magnetic anisotropy. Along with the magnetization reversal in the writing assist layer 8, interaction between spins of the writing assist layer 8 and main recording layer 7 causes magnetization reversal even in the main recording layer 7, whose magnetic anisotropy is large and magnetization is not easily reversed.

When the writing assist layer 8 with small magnetic anisotropy and the main recording layer 7 with large magnetic anisotropy are combined as described above, writing magnetic information to the main recording layer 7 is facilitated by the writing assist layer 8. Moreover, the main recording layer 7 has large magnetic anisotropy and excellent resistance to thermal fluctuation, and the written magnetic information is stably held in the main recording layer 7.

(3) Third Embodiment

In this embodiment, the writing assist layer 8 is configured to have a granular structure as well as the main recording layer 7 described in the first embodiment.

Figure 6:
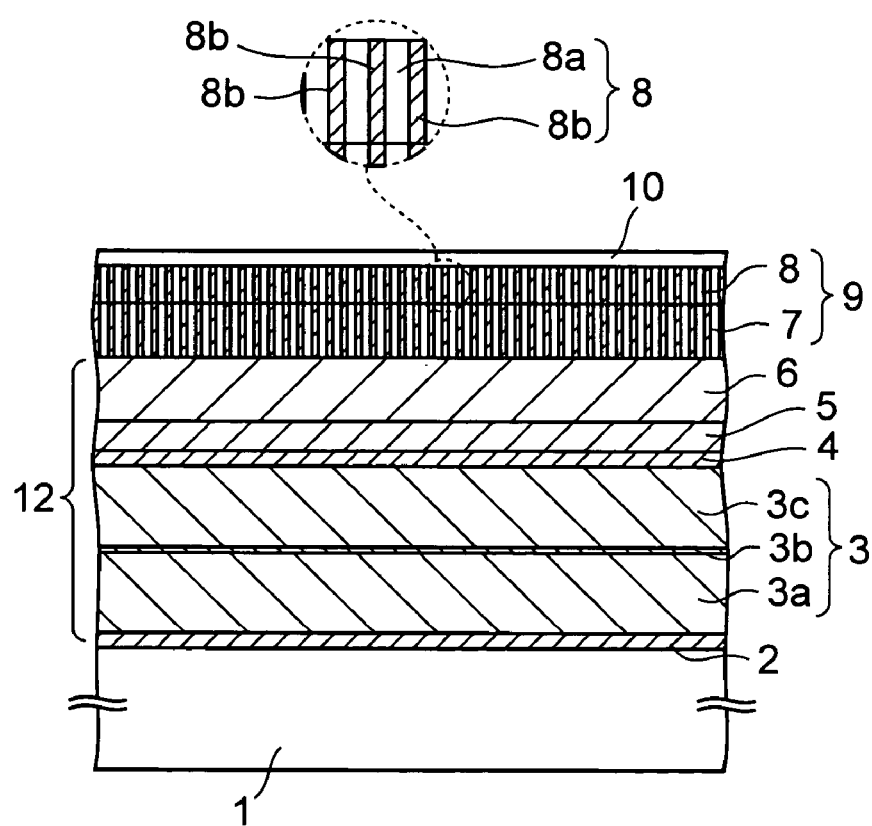
FIG. 6 is a cross-sectional view of a magnetic recording medium according to a third embodiment of the present invention.

FIG. 6 shows a cross-sectional view of a magnetic recording medium according to this embodiment. In the drawing, elements described in the first embodiment are given same reference numerals as those of the first embodiment, and the description thereof is omitted below.

As shown in FIG. 6, the writing assist layer 8 in this embodiment has a granular structure composed of a non-magnetic material 8a and magnetic grains 8b dispersed therein. The writing assist layer 8 can be deposited by a sputtering apparatus in which a target for the non-magnetic material 8a and a target for the magnetic grains 8b are provided in the same chamber.

The non-magnetic material 8a is, similar to the first embodiment, an oxide or a nitride of Si, Ti, Cr, or Zr. The magnetic grains 8b are grains composed of CoCr alloy or Co. In the case of using the CoCr alloy, Pt, Ta, B, Cu, or Ni may be added thereto.

The thus-structured writing assist layer 8 needs to have smaller perpendicular magnetic anisotropy than that of the main recording layer 7 so that magnetization is easily reversed by an external magnetic field. To reduce the perpendicular magnetic anisotropy of the writing assist layer 8, the content of the non-magnetic material 8a in the writing assist layer 8 should be lower than that of the non-magnetic material 7a in the main recording layer 7. The distance between each adjacent pair of the magnetic grains 8b is therefore reduced due to the non-magnetic material 8a. Accordingly, interaction between the magnetic grains 8b increases, and the perpendicular magnetic anisotropy of the writing assist layer 8 decreases. The magnetization reversal parameter $a_2$ in the case of the writing assist layer 8 alone is therefore larger than the magnetization reversal parameter $a_1$ of the main recording layer 7 as described in FIG. 3B, and the anisotropic magnetic field $H_{k2}$ of the writing assist layer 8 is smaller than the anisotropic magnetic field $H_{k1}$ of the main recording layer 7.

Similar to the first embodiment, the magnetization of the writing assist layer 8 with small perpendicular magnetic anisotropy is easily reversed by an external magnetic field, and the magnetization reversal of the main recording layer 7 is correspondingly induced, thus facilitating writing to the perpendicular recording layer 7. Furthermore, the main recording layer 7 has larger perpendicular magnetic anisotropy than that of the writing assist layer 8 and the magnetization of the main recording layer 7 is less likely to fluctuate with heat, and the resistance to thermal fluctuation of the main recording layer 7 is improved.

(4) Fourth Embodiment

In this embodiment, a description is given of a magnetic recording device including the magnetic recording medium 11 of the aforementioned first embodiment.

Figure 7:
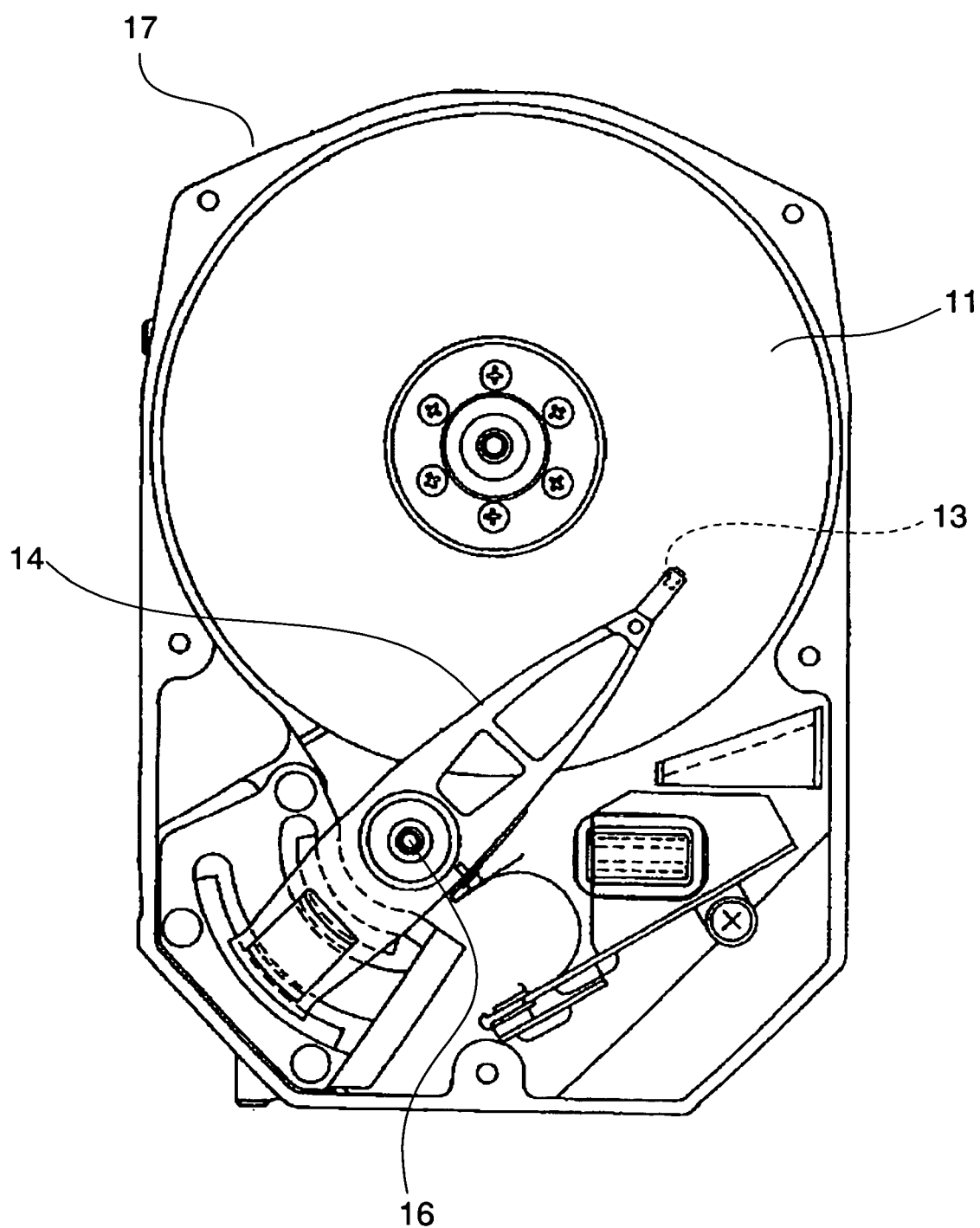
FIG. 7 is a plan view of a magnetic recording device according to a fourth embodiment of the present invention.

FIG. 7 is a plan view of the magnetic recording device. This magnetic recording device is a hard disk device mounted on a personal computer or a television recorder.

In this magnetic recording device, the magnetic recording medium 11 is housed in a case 17 as a hard disk so as to be rotated by a spindle motor or the like. Furthermore, a carriage arm 14 which can be rotated around a shaft 16 by an actuator or the like is provided within the case 17. The magnetic head 13 provided at an end of the carriage arm 14 scans the magnetic recording medium 11 from above for writing and reading magnetic information of the magnetic recording medium 11.

The type of the magnetic head 13 is not particularly limited, and the magnetic head 13 may be composed of a GMR (giant magnetoresistive) element or a TMR (ferromagnetic tunnel magnetoresistive) element.

According to the thus-structured magnetic recording device, the magnetic recording medium 11 strikes a balance between the writing performance and resistance to thermal fluctuation, so that the writing operation is facilitated while the reliability for storing information is assured over a long period of time.

The magnetic recording device is not limited to the above hard disk device and may be a device for recording magnetic information in a flexible tape-like magnetic recording medium.

According to the present invention, as described above, the main recording layer and the writing assist layer are laminated on each other, and the anisotropic magnetic fields $H_{k1}$ and $H_{k2}$ and the inclinations $a_1$ and $a_2$ of the reversal portions of the magnetization curves satisfy $H_{k1} > H_{k2}$ and $a_2 > a_1$. Accordingly, the perpendicular magnetic anisotropy of the main recording layer is larger than that of the writing assist layer, and the resistance to thermal fluctuation of the main recording layer is improved. Moreover, the writing assist layer with small perpendicular magnetic anisotropy assists magnetization reversal in the main recording layer, thus facilitating writing magnetic information to the main recording layer.

What is claimed is:

1. A magnetic recording medium, comprising:
   a base member;
   an underlayer formed on the base member;
   a main recording layer formed on the underlayer, the main recording layer having perpendicular magnetic anisotropy with an anisotropic magnetic field of $H_{k1}$ and an inclination of a reversal part of a magnetization curve of $a_1$; and
   a writing assist layer formed on or under the main recording layer in contact with the main recording layer, the writing assist layer having an anisotropic magnetic field of $H_{k2}$ and an inclination of a reversal part of a magnetization curve of $a_2$,
   wherein the anisotropic magnetic fields $H_{k1}$ and $H_{k2}$ and the inclinations $a_1$ and $a_2$ satisfy $H_{k1} > H_{k2}$ and $a_2 > a_1$.

2. The magnetic recording medium according to claim 1, wherein the main recording layer has a granular structure composed of a non-magnetic material and magnetic grains dispersed in the non-magnetic material.

3. The magnetic recording medium according to claim 1, wherein a saturated magnetization (Ms) of the writing assist layer falls within a range of equal to or grater than 350 emu/cc and equal to or less than 850 emu/cc.

4. The magnetic recording medium according to claim 2, wherein the writing assist layer and the magnetic grains are composed of an alloy containing cobalt, chromium, and platinum.

5. The magnetic recording medium according to claim 4, wherein a content of chromium in the magnetic grains is lower than that of the writing assist layer and a content of platinum is higher than that of the writing assist layer.

6. The magnetic recording medium according to claim 2, wherein the magnetic grains are composed of an alloy containing cobalt and iron.

7. The magnetic recording medium according to claim 6, wherein the magnetic grains are added with copper or silver.

8. The magnetic recording medium according to claim 2, wherein the non-magnetic material is an oxide or a nitride of one selected from the group consisting of silicon, titanium, chromium, and zirconium.

9. The magnetic recording medium according to claim 1, wherein the writing assist layer is composed of an alloy layer containing cobalt and chromium.

10. The magnetic recording medium according to claim 9, wherein the alloy layer containing cobalt and chromium is added with one selected from the group consisting of platinum, tantalum, boron, copper, and nickel.

11. The magnetic recording medium according to claim 1, wherein the underlayer is a laminate film including a backing layer having a soft magnetic layer and a non-magnetic layer formed in a uppermost layer.

12. The magnetic recording medium according to claim 11, wherein the soft magnetic layer is composed of a soft magnetic amorphous material.

13. The magnetic recording medium according to claim 12, wherein the soft magnetic amorphous material is one selected from the group consisting of a cobalt-zirconium alloy and an iron-carbon alloy.

14. The magnetic recording medium according to claim 11, wherein the main recording layer is formed on the non-magnetic layer in contact with the non-magnetic layer and has a granular structure including a non-magnetic material and magnetic grains dispersed in the non-magnetic material, and
   the non-magnetic layer has a same crystal structure as that of the magnetic grains.

15. The magnetic recording medium according to claim 14, wherein the crystal structure is an hcp structure.

16. The magnetic recording medium according to claim 15, wherein the underlayer includes an orientation control layer having a fcc crystal structure, and the non-magnetic layer is formed on the orientation control layer.

17. The magnetic recording medium according to claim 16, wherein the orientation control layer is composed of one selected from the group consisting of platinum, palladium, a nickel-iron alloy, a nickel-iron-silicon alloy, aluminum, copper, and indium.

18. A magnetic recording device, comprising:
   a magnetic recording medium which includes:
      a base member;
      an underlayer formed on the base member;
      a main recording layer formed on the underlayer, the main recording layer having perpendicular magnetic anisotropy with an anisotropic magnetic field of $H_{k1}$ and an inclination of a reversal part of a magnetization curve of $a_1$; and
      a writing assist layer formed on or under the main recording layer in contact with the main recording layer, the writing assist layer having an anisotropic magnetic field of $H_{k2}$ and an inclination of a reversal part of a magnetization curve of $a_2$; and
   a magnetic head opposing to the magnetic recording medium, wherein
   the anisotropic magnetic fields $H_{k1}$ and $H_{k2}$ and the inclinations $a_1$ and $a_2$ satisfy $H_{k1} > H_{k2}$ and $a_2 > a_1$.

19. The magnetic recording device according to claim 18, wherein the main recording layer has a granular structure composed of a non-magnetic material and magnetic grains dispersed in the non-magnetic material.

20. The magnetic recording medium according to claim 18, wherein the writing assist layer and the magnetic grains are composed of an alloy containing cobalt, chromium, and platinum.

* * * * *